(12) United States Patent
Lethellier et al.

(10) Patent No.: US 10,284,028 B2
(45) Date of Patent: May 7, 2019

(54) CHECKING ALIGNMENT OF INDUCTIVE CHARGE PADS IN MOTION

(71) Applicant: Wireless Advanced Vehicle Electrification, Inc., Salt Lake City, UT (US)

(72) Inventors: Patrice Lethellier, Salt Lake City, UT (US); Steve Ball, Sandy, UT (US); Marcellus Harper, Kaysville, UT (US); Michael Masquelier, Park City, UT (US); Hunter Wu, Sunnyvale, CA (US)

(73) Assignee: Wireless Advanced Vehicle Electrification, Inc., Salt Lake City, UT (US)

( * ) Notice: Subject to any disclaimer, the term of this patent is extended or adjusted under 35 U.S.C. 154(b) by 39 days.

(21) Appl. No.: 15/608,835

(22) Filed: May 30, 2017

(65) Prior Publication Data

US 2017/0346348 A1 Nov. 30, 2017

Related U.S. Application Data

(60) Provisional application No. 62/342,484, filed on May 27, 2016.

(51) Int. Cl.
*H02J 50/90* (2016.01)
*B60L 11/18* (2006.01)
(Continued)

(52) U.S. Cl.
CPC .............. *H02J 50/90* (2016.02); *B60L 11/182* (2013.01); *B60L 11/1829* (2013.01); *G01B 7/31* (2013.01);
(Continued)

(58) Field of Classification Search
CPC .... H02J 50/90; H02J 7/04; H02J 7/025; H02J 5/005; B60L 11/182; B60L 11/1829; G01B 2210/58
(Continued)

(56) References Cited

U.S. PATENT DOCUMENTS 8,169,185 B2  5/2012  Partovi et al.
2010/0117596 A1  5/2010  Cook
(Continued)

FOREIGN PATENT DOCUMENTS

CN  101789636  7/2010
CN  101835653  9/2010
(Continued)

OTHER PUBLICATIONS

U.S. Appl. No. 14/559,817, filed Dec. 3, 2014, Office Action dated Feb. 14, 2017.
(Continued)

*Primary Examiner* — Sun Lin
(74) *Attorney, Agent, or Firm* — Kunzler, PC; Bruce R. Needham

(57) ABSTRACT

An approach module determines that a wireless power transfer (WPT) secondary pad on a vehicle approaching a WPT primary pad is within an approach distance threshold from the WPT primary pad. A pulse module generates an electrical alignment pulse in the WPT primary pad or WPT secondary pad in response to determining that the WPT secondary pad is within the approach distance. A measurement module determines an amount of magnetic coupling between the WPT primary pad and the WPT secondary pad, and a feedback module that provides an alignment signal to a driver of the vehicle. The alignment signal represents magnetic coupling. The pulse module continues to provide electrical alignment pulses, the measurement module con-
(Continued)

tinues to determine an amount of magnetic coupling in response to the electrical alignment pulses, and the feedback module continues to provide alignment signals indicative of an amount of magnetic coupling as the vehicle moves in relation to the WPT primary pad.

20 Claims, 10 Drawing Sheets

(51) Int. Cl.
    *H02J 5/00*     (2016.01)
    *H02J 7/02*     (2016.01)
    *H02J 7/04*     (2006.01)
    *G01B 7/31*     (2006.01)
    *H02J 50/12*     (2016.01)
    *H02J 50/80*     (2016.01)

(52) U.S. Cl.
    CPC .............. *H02J 5/005* (2013.01); *H02J 7/025* (2013.01); *H02J 7/04* (2013.01); *H02J 50/12* (2016.02); *H02J 50/80* (2016.02); *G01B 2210/58* (2013.01)

(58) Field of Classification Search
    USPC .......................................................... 320/108
    See application file for complete search history.

(56) References Cited

U.S. PATENT DOCUMENTS

| | | |
|---|---|---|
| 2010/0176659 A1 | 7/2010 | Aoyama |
| 2010/0187912 A1 | 7/2010 | Kitamura et al. |
| 2010/0225271 A1 | 9/2010 | Oyobe et al. |
| 2010/0277121 A1 | 11/2010 | Hall et al. |
| 2011/0181120 A1 | 7/2011 | Liu et al. |
| 2011/0221387 A1 | 9/2011 | Steigerwald |
| 2011/0254503 A1 | 10/2011 | Widmer et al. |
| 2011/0285349 A1 | 11/2011 | Hanspeter |
| 2012/0043172 A1 | 2/2012 | Ichikawa |
| 2012/0112553 A1 | 5/2012 | Stoner, Jr. et al. |
| 2012/0139358 A1 | 6/2012 | Teggatz |
| 2012/0161696 A1 | 6/2012 | Cook |
| 2012/0217818 A1 | 8/2012 | Yerazunis |
| 2012/0235506 A1 | 9/2012 | Kallal et al. |
| 2012/0235636 A1 | 9/2012 | Partovi |
| 2012/0262002 A1 | 10/2012 | Widmer et al. |
| 2013/0002034 A1 | 1/2013 | Kohei |
| 2013/0024059 A1 | 1/2013 | Miller et al. |
| 2013/0096651 A1 | 4/2013 | Ozawa |
| 2013/0188397 A1 | 7/2013 | Wu |
| 2013/0249299 A1 | 9/2013 | Shijo |
| 2013/0320759 A1 | 12/2013 | Abe |
| 2014/0183967 A1 | 7/2014 | Ryu |
| 2014/0203662 A1 | 7/2014 | Bae |
| 2014/0217966 A1 | 8/2014 | Schneider |
| 2015/0155095 A1 | 6/2015 | Wu et al. |
| 2015/0280790 A1 | 10/2015 | Onizuka |

FOREIGN PATENT DOCUMENTS

| | | |
|---|---|---|
| CN | 102421629 | 4/2012 |
| CN | 102947124 | 2/2013 |
| EP | 2833509 | 2/2015 |
| EP | 2985870 | 2/2016 |
| WO | 2011156768 A2 | 12/2011 |
| WO | 2012099965 | 7/2012 |
| WO | 2013003527 A1 | 1/2013 |
| WO | 2013011726 A1 | 1/2013 |
| WO | 2013056234 | 4/2013 |
| WO | 2015097995 | 7/2015 |

OTHER PUBLICATIONS

International Application No. PCT/US17/35066, filed May 30, 2017, International Search Report and Written Opinion, dated Aug. 31, 2017.

U.S. Appl. No. 14/559,817, filed Dec. 3, 2014, Office Action dated Aug. 29, 2017.

CHECKING ALIGNMENT OF INDUCTIVE CHARGE PADS IN MOTION

CROSS-REFERENCES TO RELATED APPLICATIONS

This application claims the benefit of U.S. Provisional Patent Application No. 62/342,484 entitled "CHECKING ALIGNMENT OF INDUCTIVE CHARGING PADS IN MOTION" and filed on May 27, 2016 for Patrice Lethellier, et al., which is incorporated herein by reference.

FIELD

This invention relates to wireless power transfer and more particularly relates to determining alignment of a secondary pad on a vehicle with a stationary primary pad while the vehicle is in motion.

BACKGROUND

Wireless power transfer is becoming increasingly popular. Wireless power transfer involves transmitting power from a primary pad located on a stationary wireless power transfer device, such as a charging station, to a secondary pad on a mobile device, such as an electric vehicle, over a significant gap. The gap typically includes an air gap and can be significant. For example, the air gap may be from ground level to a secondary pad located under a vehicle. An air gap in the range of six inches to 10 inches is not uncommon. Prior to wireless power transfer, ensuring that the secondary pad is over the primary pad helps to provide a safe environment for wireless power transfer. Generating electromagnetic waves from the primary pad while the secondary pad is not in place over the primary pad can cause health risks, especially for people with pace makers, or other medical equipment that may be affected by the electromagnetic waves. Aligning a primary pad that transmits power with a secondary receiver pad can be difficult, especially when the secondary pad is under a vehicle.

SUMMARY

An apparatus for determining alignment of charging pads while in motion is disclosed. A system and method also perform the functions of the apparatus. The apparatus includes an approach module that determines that a wireless power transfer ("WPT") secondary pad on a vehicle approaching a WPT primary pad is within an approach distance threshold from the primary pad. The apparatus includes a pulse module that generates an electrical alignment pulse in the primary pad or the secondary pad in response to the approach module determining that the secondary pad is within the approach distance. The apparatus includes a measurement module that determines an amount of magnetic coupling between the primary pad and the secondary pad, and a feedback module that provides an alignment signal to a driver of the vehicle. The alignment signal is indicative of the amount of magnetic coupling. The pulse module continues to provide electrical alignment pulses, the measurement module continues to determine an amount of magnetic coupling in response to the electrical alignment pulses, and the feedback module continues to provide alignment signals to the driver indicative of an amount of magnetic coupling as the vehicle moves in relation to the primary pad.

A system for determining alignment of charging pads while in motion includes a first stage of a WPT system. The first stage includes a primary pad and a resonant converter and/or an alternating current ("AC") to direct current ("DC") converter. The first stage is configured to wirelessly transmit power to a second stage on a vehicle, and the second stage includes a secondary pad and a secondary circuit that receives power from the primary pad and transfers power to a load of the vehicle. The system includes an approach module that determines that a secondary pad on a vehicle approaching the primary pad is within an approach distance threshold from the primary pad. The system includes a pulse module that generates an electrical alignment pulse in one of the primary pad and the secondary pad in response to the approach module determining that the secondary pad is within the approach distance, a measurement module that determines an amount of magnetic coupling between the primary pad and the secondary pad, and a feedback module that provides an alignment signal to a driver of the vehicle, the alignment signal indicative of the amount of magnetic coupling. The pulse module continues to provide electrical alignment pulses, the measurement module continues to determine an amount of magnetic coupling in response to the electrical alignment pulses, and the feedback module continues to provide alignment signals to the driver indicative of an amount of magnetic coupling as the vehicle moves in relation to the primary pad.

A method for determining alignment of charging pads while in motion includes determining that a WPT secondary pad on a vehicle approaching a WPT primary pad is within an approach distance threshold from the primary pad, generating an electrical alignment pulse in one of the primary pad and the secondary pad in response to determining that the secondary pad is within the approach distance, determining an amount of magnetic coupling between the primary pad and the secondary pad, and providing an alignment signal to a driver of the vehicle, the alignment signal indicative of the amount of magnetic coupling. The method continues to provide electrical alignment pulses, continues to determine an amount of magnetic coupling in response to the electrical alignment pulses, and continues to provide alignment signals to the driver indicative of an amount of magnetic coupling as the vehicle moves in relation to the primary pad.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
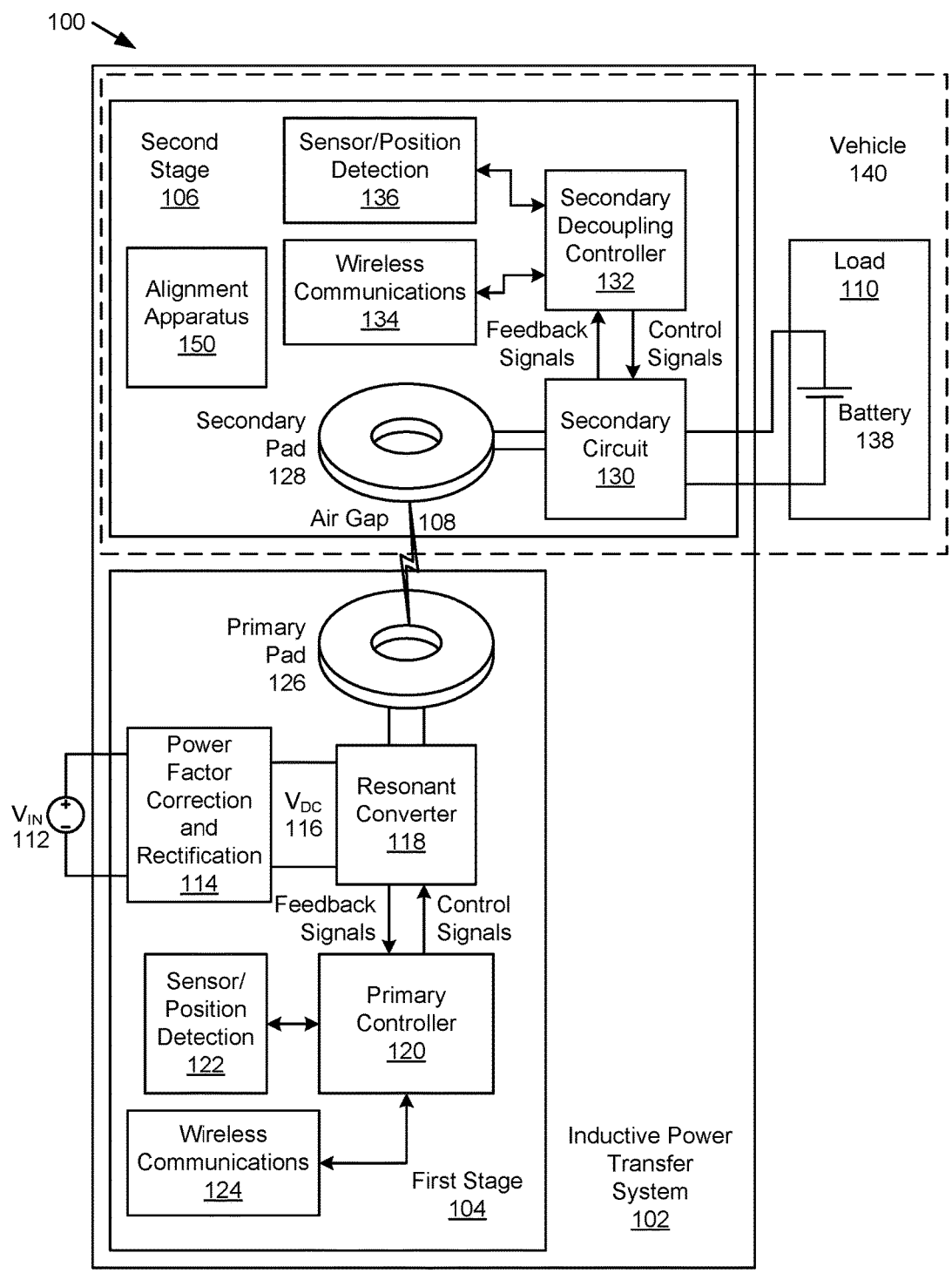
FIG. 1 illustrates a block diagram of an exemplary wireless power transfer ("WPT") system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

A portion or all of these computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

An apparatus for determining alignment of charging pads while in motion is disclosed. A system and method also perform the functions of the apparatus. The apparatus includes an approach module that determines that a wireless power transfer ("WPT") secondary pad on a vehicle approaching a WPT primary pad is within an approach distance threshold from the primary pad. The apparatus includes a pulse module that generates an electrical alignment pulse in the primary pad or the secondary pad in response to the approach module determining that the secondary pad is within the approach distance. The apparatus includes a measurement module that determines an amount of magnetic coupling between the primary pad and the secondary pad, and a feedback module that provides an alignment signal to a driver of the vehicle. The alignment signal is indicative of the amount of magnetic coupling. The pulse module continues to provide electrical alignment pulses, the measurement module continues to determine an amount of magnetic coupling in response to the electrical alignment pulses, and the feedback module continues to provide alignment signals to the driver indicative of an amount of magnetic coupling as the vehicle moves in relation to the primary pad.

In one embodiment, the alignment signal is a visual indicator on an electronic display and/or an audio signal. In another embodiment, the feedback module includes a lower limit module that provides a visual indication that the amount of magnetic coupling is above a lower coupling limit and/or an audio signal with a distinct sound indicative of the amount of magnetic coupling being above the lower coupling limit. In another embodiment, the feedback module includes an upper limit module that provides a visual indication that the amount of magnetic coupling is below an upper coupling limit and/or an audio signal comprising a distinct sound indicative of the amount of magnetic coupling being below the upper coupling limit. In another embodiment, the feedback module dynamically adjusts the lower coupling limit and the upper coupling limit in based on a battery charge level of a battery on the vehicle, a load level of the vehicle, and/or one or more operating limits of a wireless power transfer system that includes the primary pad and the secondary pad.

In one embodiment, the pulse module generates the alignment pulse in the primary pad, and the measurement module measures a secondary voltage on a circuit coupled to the secondary pad and primary current in the primary pad, where the amount of magnetic coupling is proportional to a ratio of the secondary voltage and the primary current. In another embodiment, the pulse module generates the alignment pulse in the secondary pad, and the measurement module measures a primary voltage on a circuit coupled to the primary pad and secondary current in the secondary pad, where the amount of magnetic coupling is proportional to a ratio of the primary voltage and the secondary current.

In one embodiment, the approach module determines if the secondary pad is within the approach distance threshold from the primary pad by generating a low power pulse on the secondary pad and determining if a signal is present on the primary pad is above an approach signal threshold or generating a low power pulse on the primary pad and determining if a signal is present on the secondary pad is above an approach signal threshold, where the low power pulse has a power level lower than a power level for wireless power charging from the primary pad to the secondary pad. In another embodiment, the approach module generates the low power pulse in response to radio contact between the vehicle and one or more components of a first stage comprising the primary pad, radio signal strength between the vehicle and one or more components of the first stage comprising the primary pad being above a radio signal threshold, speed of the vehicle being below a speed threshold, and/or a global positioning satellite ("GPS") signal indicating that the secondary pad is within a GPS distance limit from the primary pad.

In another embodiment, the approach module automatically generates the low power pulse, manually generates the low power pulse in response to an input from an operator of the vehicle, and/or manually generates the low power pulse in response to an input from an operator of the vehicle and one or more safety conditions being met. In another embodiment, the approach module generates the low power pulse from the secondary pad and the pulse module generates the alignment pulse on the primary pad. In another embodiment, the pulse module generates the electrical alignment pulse prior to the primary pad transmitting power to the secondary pad during a wireless power transfer operation to provide power to a load of the vehicle. In another embodiment, the approach distance threshold is based on magnetic field safety limits.

In one embodiment, the apparatus includes a kneeling module that lowers a portion of the vehicle, where the feedback module provides the alignment signal to the driver of the vehicle in response to the vehicle approaching the primary pad and/or the kneeling module lowering the portion of the vehicle. In another embodiment, the electrical alignment pulse includes a constant amount of energy for a period of time followed by a time with no pulse, wherein the pulse module provides a plurality of alignment pulses as the vehicle moves in relation to the primary pad, and/or a ramped alignment pulse. The ramped alignment pulse is generated by increasing an amount of energy over a period of time, where the pulse module provides a plurality of ramped alignment pulses as the vehicle moves in relation to the primary pad.

A system for determining alignment of charging pads while in motion includes a first stage of a WPT system. The first stage includes a primary pad and a resonant converter and/or an alternating current ("AC") to direct current ("DC") converter. The first stage is configured to wirelessly transmit power to a second stage on a vehicle, and the second stage includes a secondary pad and a secondary circuit that receives power from the primary pad and transfers power to a load of the vehicle. The system includes an approach module that determines that a secondary pad on a vehicle approaching the primary pad is within an approach distance threshold from the primary pad. The system includes a pulse module that generates an electrical alignment pulse in one of the primary pad and the secondary pad in response to the approach module determining that the secondary pad is within the approach distance, a measurement module that determines an amount of magnetic coupling between the primary pad and the secondary pad, and a feedback module that provides an alignment signal to a driver of the vehicle, the alignment signal indicative of the amount of magnetic coupling. The pulse module continues to provide electrical alignment pulses, the measurement module continues to determine an amount of magnetic coupling in response to the electrical alignment pulses, and the feedback module continues to provide alignment signals to the driver indicative of an amount of magnetic coupling as the vehicle moves in relation to the primary pad.

In one embodiment, the system includes one or more of the second stage, the vehicle and the load.

A method for determining alignment of charging pads while in motion includes determining that a WPT secondary pad on a vehicle approaching a WPT primary pad is within an approach distance threshold from the primary pad, generating an electrical alignment pulse in one of the primary pad and the secondary pad in response to determining that the secondary pad is within the approach distance, determining an amount of magnetic coupling between the primary pad and the secondary pad, and providing an alignment signal to a driver of the vehicle, the alignment signal indicative of the amount of magnetic coupling. The method continues to provide electrical alignment pulses, continues to determine an amount of magnetic coupling in response to the electrical alignment pulses, and continues to provide alignment signals to the driver indicative of an amount of magnetic coupling as the vehicle moves in relation to the primary pad.

In one embodiment, the method includes providing a visual indication that the amount of magnetic coupling is above a lower coupling limit and/or an audio signal with a distinct sound indicative of the amount of magnetic coupling being above the lower coupling limit. In the embodiment, the method includes providing a visual indication that the amount of magnetic coupling is below an upper coupling limit and/or an audio signal with a distinct sound indicative of the amount of magnetic coupling being below the upper coupling limit. In another embodiment, determining if the secondary pad is within the approach distance threshold from the primary pad includes generating a low power pulse on the secondary pad and determining if a signal is present on the primary pad is above an approach signal threshold, or generating a low power pulse on the primary pad and determining if a signal is present on the secondary pad is above an approach signal threshold, where the low power pulse has a power level lower than a power level for wireless power charging from the primary pad to the secondary pad.

FIG. 1 illustrates a block diagram of an exemplary wireless power transfer ("WPT") system 100. The WPT system 100 of FIG. 1 is one embodiment of a WPT system 100 that may include an inductive power transfer ("IPT") system 102, as described below. In other embodiments, the IPT system 102 may be used for purposes other than for charging. The IPT system 102 includes a first stage 104, a second stage 106, and wireless power transfer between the first stage 104 and second stage 106 over an air gap 108. The WPT system 100 includes a load 110 and a voltage source 112. The elements of the WPT system 100 are described below.

The WPT system 100 includes, in one embodiment, a first stage 104 with a resonant converter 118, such as an LCL (i.e. inductor-capacitor-inductor) load resonant converter, a series resonant converter, etc., that receives a direct current ("DC") voltage 116 and generates an alternating current ("AC") voltage waveform in the primary pad 126. For example, a switching section may alternatively connect the DC voltage 116 to an LCL load resonant section at a particular frequency to generate an AC voltage waveform. The AC voltage waveform, in some embodiments, is not a pure sinusoidal waveform and includes harmonic voltages. Filtering in the resonant converter 118 may reduce harmonic content.

The AC voltage waveform and associated current are transmitted to the primary pad 126, which generates an electromagnetic waveform shaped by the design of the primary pad 126 to radiate in a direction toward the secondary pad 128. Through magnetic coupling, an electromagnetic waveform is induced in the secondary pad 128 and generates an AC electrical waveform in the secondary pad 128. The electrical waveform, with a particular voltage waveform and current waveform, in the secondary pad 128 transfers power to the secondary circuit 130, which may condition the voltage and current for use by a load 110, such as a battery 138, electric motor, etc. The secondary circuit may include a rectifier section and may also include a DC-DC converter, or similar circuit to regulate voltage and/or current to the load 110. The second stage 106 and load 110 may be part of a vehicle 140.

The primary controller 120 controls the resonant converter 118 and the secondary decoupling controller 132 controls the secondary circuit 130. The WPT system 100 may also include one or more sensors for position detection 122. While the sensors for position detection 122 is shown in the first stage 104, one of skill in the art will recognize that all or part of the sensors for position detection 122 may be located in the second stage 106, on the vehicle 140, or elsewhere in the IPT system 102. In one embodiment, the WPT system 100 includes wireless communications 124, 134 that provide for communication between the first stage 104 and the second stage 106. Wireless communication may be used for control, position sensing, identification, and the like.

The WPT system 100 described herein may include a power factor stage 114, such as a primary alternating current ("AC") to direct current ("DC") power factor stage, fed from a voltage source 112, such as from a utility power grid. In some embodiments, a primary AC-DC converter stage may be configured to convert grid-level voltages to a DC voltage 116, such as a DC bus voltage, for a primary tuned resonant converter. A DC output voltage with low output ripple is preferred to large ripple systems in order to prevent an amplitude modulated signal appearing in the wireless inductive power transfer system which can cause reduced efficiency and require additional complexity.

In some embodiments, active power factor correction ("PFC") in AC-DC converters may help to ensure the grid voltage and current are closely in phase. PFC may reduce overall grid current requirements and typically reduces grid harmonics. Grid power supply companies typically have certain harmonic requirements for attached industrial equipment. Often grid power supply companies also charge extra for power to industrial equipment that exhibits low power factor.

In the WPT system 100 described herein, one or more suitable stages may be used for PFC. For example, one or more commercial off-the-shelf ("COTS") AC-DC high efficiency power factor corrected converters may be used. The grid voltage source 112 may be a wide range of voltage inputs including, for example, single-phase 240 VAC, three-phase 208 VAC, or three-phase 480 VAC. In another embodiment, a 400 VDC output may be used for this stage and 400 VDC is typically an efficient output for a nominal grid input of single-phase 240 VAC grid input. A single-phase 240 VAC grid voltage with a 30 A circuit (suitable for a 5 kW WPT system) is commonplace in the United States even in areas that do not support industrial three-phase voltages, and may be used with the WPT system 100. In one embodiment, the WPT system 100 is capable of transmitting 250 kW or more from the primary pad 126 to the secondary pad 128. In another embodiment, the primary pad 126 and/or secondary pad 128 include more than one charging pad. The charging pads may be arranged to facilitate providing alignment information.

For the WPT system 100, in one embodiment, the first stage 104 includes a resonant converter 118 controlled by a primary controller 120 that may receive feedback signals from and may send control signals to the resonant converter 118. A primary controller 120 may receive information from alignment sensors for position detection 122 and may communicate using wireless communications 124. The resonant converter 118 is coupled to a primary pad 126 coupled to a secondary pad 128 over an air gap 108. While an air gap 108 is depicted, one of skill in the art will recognize that at least a portion of the space between the primary pad 126 and the secondary pad 128 include other materials and substances, such as concrete, resin, asphalt, metal, and the like. The secondary pad 128 is connected to a parallel decoupling pickup shown as a secondary circuit 130 controlled by a secondary decoupling controller 132 that may receive feedback signals and may send control signals to the secondary circuit 130. The secondary decoupling controller 132 may also communicate with alignment sensors for position detection 136 for control and may communicate wirelessly 134. The secondary circuit 130 may connect to a load 110, such as a battery 138 and may charge the battery 138. The battery 138 may provide power to another load, such as a motor controller (not shown). The second stage 106 and load 110 may be located in a vehicle 140.

The WPT system 100 includes an alignment apparatus 150, which is depicted in the second stage 106. All or a portion of the alignment apparatus 150 may be located elsewhere, such as in the vehicle 140, the inductive power transfer system 102, etc. While the vehicle 140 is moving, the alignment apparatus 150 generates a pulse in the primary pad 126 or secondary pad 128 after the secondary pad 128 is within an approach distance threshold. The alignment apparatus 150 determines an amount of magnetic coupling between the primary pad 126 and the secondary pad 128 and provides a driver of the vehicle 140 an alignment signal, which is indicative of the amount of magnetic coupling. The alignment apparatus 150 is described in more detail with regard to the apparatuses 200, 300 of FIGS. 2 and 3.

Figure 2:
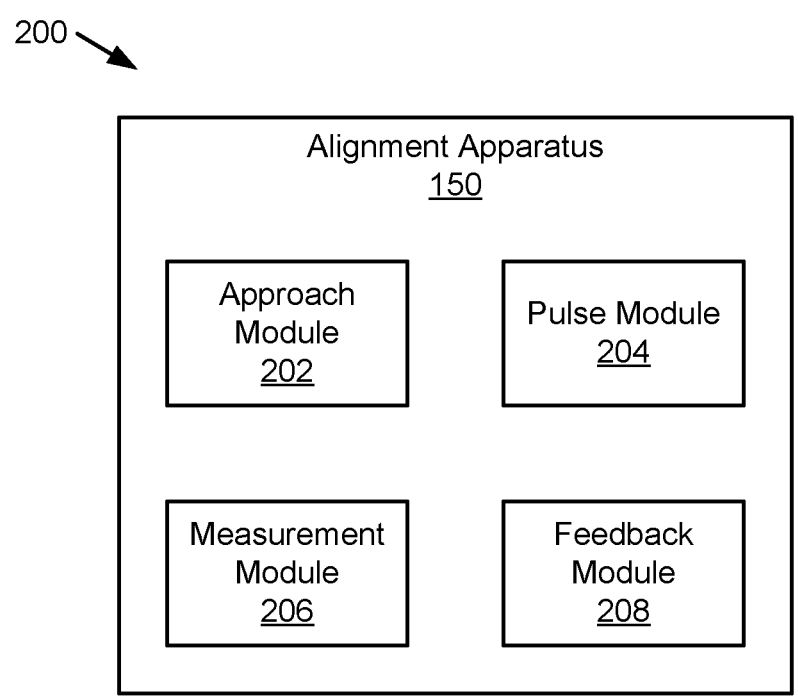
FIG. 2 is a schematic block diagram illustrating one embodiment of an apparatus for alignment in accordance with one embodiment of the present invention.

FIG. 2 is a schematic block diagram illustrating one embodiment of an apparatus 200 for alignment in accordance with one embodiment of the present invention. The apparatus 200 includes one embodiment of the alignment apparatus 150 that includes an approach module 202, a pulse module 204, a measurement module 206 and the feedback module 208, which are described below.

The apparatus 200 includes an approach module 202, which, in one embodiment, determines that a WPT secondary pad 128 on a vehicle 140 approaching a WPT primary pad 126 is within an approach distance threshold from the primary pad 126. The approach distance threshold, in one embodiment, is a distance between the primary pad 126 and the secondary pad 128 where it is appropriate to generate an electrical pulse within the primary pad 126 or secondary pad 128 appropriate to determine magnetic coupling between the primary pad 126 and the secondary pad 128 to determine alignment between the primary pad 126 and the secondary pad 128.

In another embodiment, the approach distance threshold is based on one or more safety standards. For example, the approach distance threshold may be based on the vehicle 140 covering the primary pad 126 enough so that a pulse generated in the primary pad 126 and the associated magnetic field generated by the pulse will be below magnetic field safety limits at the edges of the vehicle 140. The approach distance threshold, in another embodiment, takes into account a power level associated with the generated pulse. For example, the approach distance threshold may be a distance greater than an amount of alignment for full wireless power transfer where the pulse generated for determining alignment is a lower power level than a power level generated by the primary pad 126 during full or even partial wireless power transfer.

The approach distance threshold, in one embodiment, is sized based on dimensions of the vehicle 140 in relation to the size and position of the secondary pad 128 and the size, orientation, etc. of the primary pad 126. In another embodiment, an area comprising the approach distance threshold is circular. In another embodiment, the area comprising the approach distance threshold is another shape, such as a rectangle, a square, or other shape. One of skill in the art will recognize requirements and factors used in determining an approach distance threshold.

In one embodiment, the approach module 202 determines that the secondary pad 128 is within the approach distance threshold from the primary pad 126 by generating a low power pulse on the secondary pad 128 and determining if a signal is present on the primary pad 126 that is above an approach signal threshold. In the embodiment, the low power pulse has a power level lower than a power level for wireless power charging from the primary pad 126 to the secondary pad 128. Generating a low power pulse from the secondary pad 128 is typically safer than generating a low power pulse from the primary pad 126 to reduce exposure to the magnetic field generated by the low power pulse because the primary pad 126 may be partially or fully uncovered at the time of the low power pulse. Wireless communications may be used for the alignment apparatus 150 to communicate with the primary pad 126.

The low voltage pulse may be called a ping signal. In the embodiment, a ping detection module may detect a ping signal from the secondary pad 128 to the primary pad 126 and a signal strength module may then determine a signal strength of the ping signal received at the primary pad 126. An alignment module may then determine an amount of alignment of the secondary pad 128 with respect to the primary pad 126 based on the determined signal strength of the ping signal. The approach module 202 may then use the amount of alignment to determine if the secondary pad 128 is within the approach distance threshold from the primary pad 126. Using a ping signal generated on the secondary pad 128 is described in more detail in U.S. Application No. 62/211,540, filed Aug. 28, 2015 for Marcellus Harper, et al., which is incorporated herein by reference for all purposes.

In another embodiment, the approach module 202 generates the low power pulse in response to radio contact between the vehicle 140 and one or more components of the first stage 104 that includes the primary pad 126, speed of the vehicle 140 being below a speed threshold, and/or a global positioning satellite ("GPS") signal indicating that the secondary pad 128 is within a GPS distance limit from the primary pad 126. In one example, the approach module 202 generates the low power pulse in response after establishing radio contact with the first stage 104, after the speed of the vehicle 140 is below a speed threshold and after the secondary pad 128 and/or vehicle 140 is within a GPS distance from the primary pad 126. In another embodiment, the approach module 202 generates the low power pulse in response to a signal from an operator of the vehicle 140. In another embodiment, the approach module 202 generates the low power pulse in response to a radio signal strength between the vehicle 140 and one or more components of the first stage 104 with the primary pad 126 being above a radio signal threshold.

In one embodiments, the approach module 202 automatically generates the low power pulse. In another embodiment, the approach module 202 manually generates the low power pulse in response to an input from an operator of the vehicle 140. In another embodiment, the approach module 202 manually generates the low power pulse in response to an input from an operator of the vehicle and one or more safety conditions being met. For example, the safety conditions may be as described above for determining the approach distance threshold. The operator may determine that safety conditions are met or sensors, signals, etc. may be used to determine if the safety conditions are met, such as being within the approach distance threshold.

The apparatus 200 includes a pulse module 204 that generates an electrical alignment pulse in the primary pad 126 or in the secondary pad 128. The alignment pulse, in one embodiment, is more powerful than the low power pulse used by some embodiments of the approach module 202. In another embodiment, the low power pulse is generated less frequently than the electrical alignment pulse and may be lower power or the same power as the electrical alignment pulse. An electrical alignment pulse that includes a higher power pulse may be beneficial to more accurately determine alignment of the primary pad 126 and the secondary pad 128.

The alignment pulse may be of a same magnitude as a signal generated in the primary pad 126 during wireless power transfer. In other embodiments, the alignment pulse is of a lower magnitude than a signal generated in the primary pad 126. For example, where the primary pad 126 includes multiple pads, the pulse module 204 may generate the alignment pulse in a subset of the pads of the primary pad 126. In another embodiment, the charging pads on the primary or secondary are included that differ from the primary pad 126 and secondary pad 128 where the charging pads are specifically designed to be lower power and to be used to generate and/or receive the electrical alignment pulse. The charging pads may be around the primary and/or secondary pads 126, 128, in the center of the primary and/or secondary pads 126, 128, etc. In another embodiment, the alignment pulse in each pad used by the pulse module 204 has a lower magnitude than a signal during wireless power transfer. Pads used by the pulse module 204 may be strategically placed. For example, if there are four pads in the primary pad 126 in a square pattern, the pulse module 204 may generate an alignment pulse in two pads in opposite corners. Other combinations of pads of a primary pad 126 may also be used.

In one embodiment, the primary pad 126 is part of a series of primary pads 126 in a roadway that transfer power to a moving vehicle 140. In the embodiment, charging pads may be placed in the roadway that each generate electrical alignment pulses. For example, the charging pads may be in line with and in between primary pads 126 and may exclusively transmit electrical alignment signals. In one embodiment, the driver is an autonomous driving system of the vehicle 140 which uses the alignment signals from the feedback module 208 to control steering of the vehicle 140. In one embodiment, the autonomous driving system guides the vehicle 140 to a stationary primary pad 126 for battery charging using the alignment signals from the feedback module 208. In another embodiment, the autonomous driving system guides the vehicle 140 using the alignment signals from the feedback module 208 for primary pads 126 along a roadway. One of skill in the art will recognize other ways that an autonomous driving system may use alignment signals from the feedback module 208 to guide the vehicle 140.

In one embodiment, the alignment pulse has a duration long enough for voltages and currents in the WPT system 100 to reach a steady state. The duration of a pulse may be longer than a period of a switching frequency within a converter feeding the primary pad 126. For example, the switching frequency may be in the 20-40 kilohertz range (i.e. a period of 50 to 25 micro seconds) and the alignment pulse may have a duration of 1 millisecond or longer. Therefore, during an alignment pulse, voltage applied to the primary pad 126 may go through numerous cycles to allow voltages and currents in the WPT system 100 to reach a steady state condition to achieve a more accurate measurement of magnetic coupling.

The apparatus 200 includes a measurement module 206 that determines an amount of magnetic coupling between the primary pad 126 and the secondary pad 128. For example, the measurement module 206 may measure current in the pad where the pulse module 204 generates the alignment pulse, (i.e. the primary pad 126 or secondary pad 128) and the measurement module 206 may measure voltage on the pad receiving the alignment pulse. The measurement module 206 may then determine a ratio between the measured voltage and measured current, which is proportional to the amount of magnetic coupling. For example, if the pulse module 204 generates an alignment pulse in the primary pad 126, the measurement module 206 may determine the current in the primary pad 126 and secondary voltage generated by the secondary pad 128, which may be called output voltage. The secondary voltage, in one embodiment, is a voltage provided to a load 110, such as a battery 138, an electric motor, etc. of the vehicle 140. A ratio of the secondary voltage and current in the primary pad 126, which may be referred to as primary track current, is related to a magnetic coupling coefficient between the primary pad 126 and the secondary pad 128. The coupling coefficient is related to alignment of the primary pad 126 with the secondary pad 128.

In another embodiment, the measurement module 206 determines a coupling coefficient (e.g. amount of magnetic coupling) using a coupling coefficient formula where the output voltage and/or bridge current are variables and coupling coefficient is an output of the coupling coefficient formula. In another embodiment, the primary converter and secondary converter comprise an inductor-capacitor-inductor ("LCL") resonant inverter system and the coupling coefficient formula is:

$$i_b = \frac{L_b L_m M R_2 V_1 s^2}{C_1 \beta \left(V_1 - \frac{L_m V_1 \sigma_3}{C_1 n^2 \left(L_b s + \frac{L_m \sigma_3}{C_1 n^2 \sigma_1 \sigma_2}\right) \sigma_1 \sigma_2}\right) \sigma_1 \left(R_2 + L_2 s + \frac{1}{C_2 s}\right) \sigma_2}$$

where:

$$\beta = L_b s + \frac{L_m \sigma_3}{C_1 n^2 \sigma_1 \sigma_2}$$

$$\sigma_1 = L_m s + \frac{\sigma_3}{C_1 n^2 s \sigma_2}$$

$$\sigma_2 = L_1 s + \frac{1}{C_1 s} + \frac{1}{C_{1s} s} - \frac{M^2 s^2}{R_2 + L_2 s + \frac{1}{C_2 s}}$$

$$\sigma_3 = L_1 s + \frac{1}{C_{1s} s} - \frac{M^2 s^2}{R_2 + L_2 s + \frac{1}{C_2 s}}$$

$$k = \frac{M}{\sqrt{L_1 \cdot L_2}}$$

and:
k coupling coefficient;
M Mutual inductance between primary transmitter pad and the secondary receiver pad;
$L_1$ Self-inductance of the primary pad 126;
$L_2$ Self-inductance of the secondary pad 128;
$i_b$ Inductor current of inductor $L_b$, which is in series with an input to a an LCL load resonant tank connected to the primary pad 126, the LCL load resonant tank and the primary pad 126 are part of a primary converter;

$L_m$ Transformer magnetizing inductance (where the LCL load resonant tank includes an inductor) the primary pad;

$C_2$ Parallel tuning capacitor on a secondary resonant circuit of a secondary converter where the secondary pad 128 is part of the secondary converter;

$C_{1s}$ Series tuning capacitor on a primary LCL load resonant converter of the primary converter;

$C_1$ Parallel tuning capacitor on the primary LCL load resonant converter;

$L_b$ Bridge inductance of LCL load resonant converter;

$R_2$ Initial output voltage divided by output current;

$V_1$ DC input voltage to the primary LCL load resonant converter;

s i• ω where i is an imaginary number

ω Angular operating frequency of primary converter in radians where w=2πf;

f Operating frequency of the primary converter in hertz; and n Turns ratio of a transformer in the primary converter.

Determining magnetic coupling using the formula above, as well as other methods for determining magnetic coupling are described in more detail in U.S. patent application Ser. No. 14/559,817 filed Dec. 3, 2014 for Hunter H. Wu, et al., which is incorporated herein by reference for all purposes. Other resonant converter topologies will have a different equation, but the coupling coefficient may also be determined for other topologies. In one embodiment, the approach module 202 generates the low power pulse from the secondary pad 128 and the pulse module 204 generates the alignment pulse on the primary pad 126. Using the secondary pad 128 for initial alignment and then the primary pad 126 for more refined alignment may facilitate meeting magnetic field exposure safety standards.

In another embodiment, the pulse module 204 generates the alignment pulse using the secondary pad 128 and the measurement module 206 measures voltage generated on the primary pad 126 (or across other connected circuits) or other parameters in the IPT system 102 as well as secondary current in the secondary pad 128 to determine magnetic coupling between the primary pad 126 and the secondary pad 128. In one embodiment, the pulse module 204 generates the electrical alignment pulse prior to the primary pad 126 transmitting power to the secondary pad 128 during a wireless power transfer operation to provide power to a load 110 of the vehicle 140.

In another embodiment, the electrical alignment pulse includes a constant amount of energy for a period of time followed by a time with no pulse, where the pulse module 204 provides a plurality of alignment pulses as the vehicle 140 moves in relation to the primary pad 126. In another embodiment, the electrical alignment pulse includes a ramped alignment pulse, the ramped alignment pulse generated by increasing an amount of energy over a period of time, where the pulse module 204 provides a plurality of ramped alignment pulses as the vehicle 140 moves in relation to the primary pad 126.

Figure 7A:
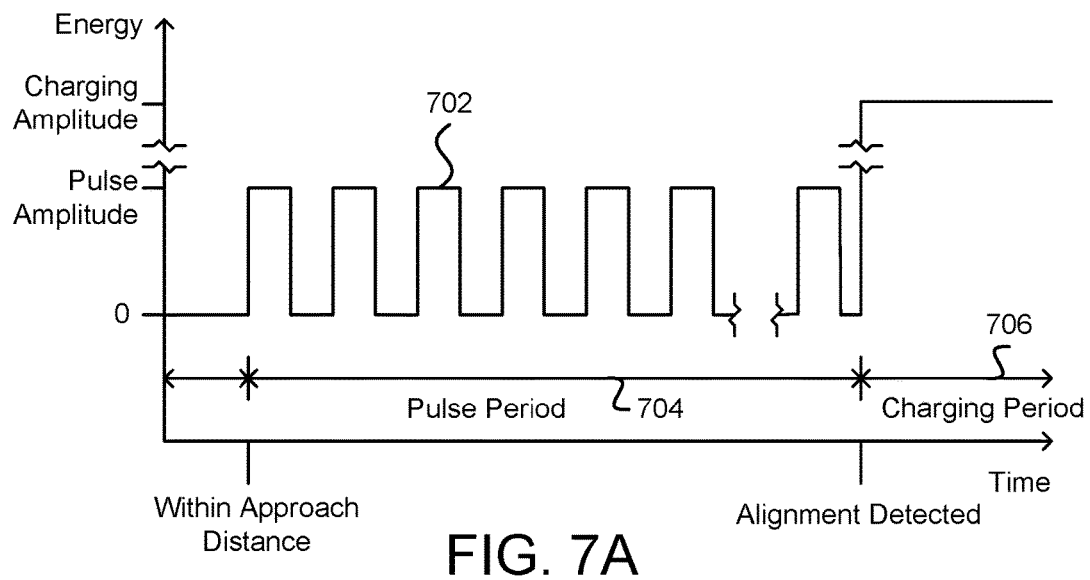
FIG. 7A is an illustration of one embodiment of constant energy pulses during a pulse period followed by a charging period.

FIG. 7A is an illustration of one embodiment of constant energy pulses 702 during a pulse period 704 followed by a charging period 706. In the embodiment, the constant energy pulses 702 include pulses that jump to a constant amplitude and then to zero with a duty cycle of 50%. In other embodiments, the duty cycle may be different, such a duty cycle of 10% or 1%. Typically, the time-period where a constant energy pulse is at a constant amplitude is long enough to determine a coupling coefficient between the primary pad 126 and the secondary pad 128. A time between pulses may be chosen to have enough constant energy pulses to provide real-time feedback to the driver of the vehicle 140. Where the bus is moving on the order of seconds and the constant energy pulses 702 may be on the order of milliseconds, or even microseconds, the time-period between pulses may be considerable to achieve real-time feedback. Once alignment is deemed adequate for charging, the primary pad 126 may transmit energy at an amplitude higher than the constant energy pulses at a sustained energy level, which may vary over the charging period 706.

Figure 7B:
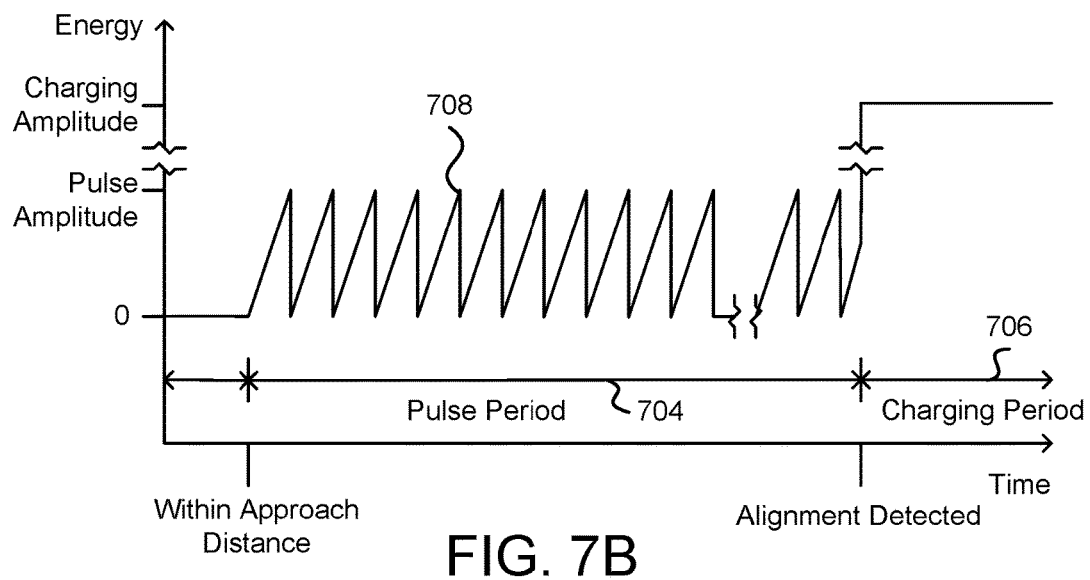
FIG. 7B is an illustration of one embodiment of ramped alignment pulses during a pulse period followed by a charging period.

FIG. 7B is an illustration of one embodiment of ramped alignment pulses 708 during a pulse period 704 followed by a charging period 706. In the embodiment, the ramped alignment pulses 708 include pulses that ramp from zero to a pulse amplitude and then to zero with a duty cycle of 100%. In other embodiments, the duty cycle may be different, such a duty cycle of 50%, 10% or 1% with time between ramped alignment pulses 708. As with the example of FIG. 7A, time between pulses may be chosen to have enough constant energy pulses to provide real-time feedback to the driver of the vehicle 140. Where the bus is moving on the order of seconds and the ramped alignment pulses 708 may be on the order of milliseconds, or even microseconds, the time-period between pulses may be considerable to achieve real-time feedback. Once alignment is deemed adequate for charging, the primary pad 126 may transmit energy at an amplitude higher than the constant energy pulses at a sustained energy level, which may vary over the charging period 706.

The apparatus 200 includes a feedback module 208 that provides an alignment signal to a driver of the vehicle 140. The alignment signal is indicative of the amount of magnetic coupling. In one embodiment, the feedback module 208 provides a visual indicator, for example on an electronic display. For example, the electronic display may include a bar chart where the bar increases as magnetic coupling increases. In another embodiment, the display includes a rotating needle display, similar to a speedometer, that increases as magnetic coupling increases. In another embodiment, the display is a heads-up display visible in the windshield of the vehicle so that the driver of the vehicle does not have to look away from what is ahead of the vehicle.

In another embodiment, the feedback module 208 uses an alignment signal that includes an audio signal. For example, the audio signal may include a sound that increases in pitch, volume, etc. as magnetic coupling increases. For example, the audio signal may include beeps or clicks that start at a low frequency and the beeps or clicks increase in frequency as magnetic coupling increases. In another example, the audio signal includes spoken words or phrases to indicate an amount of magnetic coupling.

In one embodiment, the pulse module 204 continues to provide electrical alignment pulses, the measurement module 206 continues to determine an amount of magnetic coupling in response to the electrical alignment pulses, and the feedback module 208 continues to provide alignment signals indicative of an amount of magnetic coupling as the vehicle 140 moves in relation to the primary pad 126. In the embodiment, the alignment signal moves continually throughout the alignment process vary a display or audio signal as magnetic coupling changes. Beneficially, continual updates as the pulse module 204, the measurement module 206 updates the magnetic coupling and then the feedback module 208 updates the alignment signal through the display and/or audio signals so that the driver of the vehicle 140 can better stop the vehicle 140 in a position where alignment is high. A high magnetic coupling typically is more electrically efficient than wireless power transfer with a low magnetic coupling.

Figure 3:
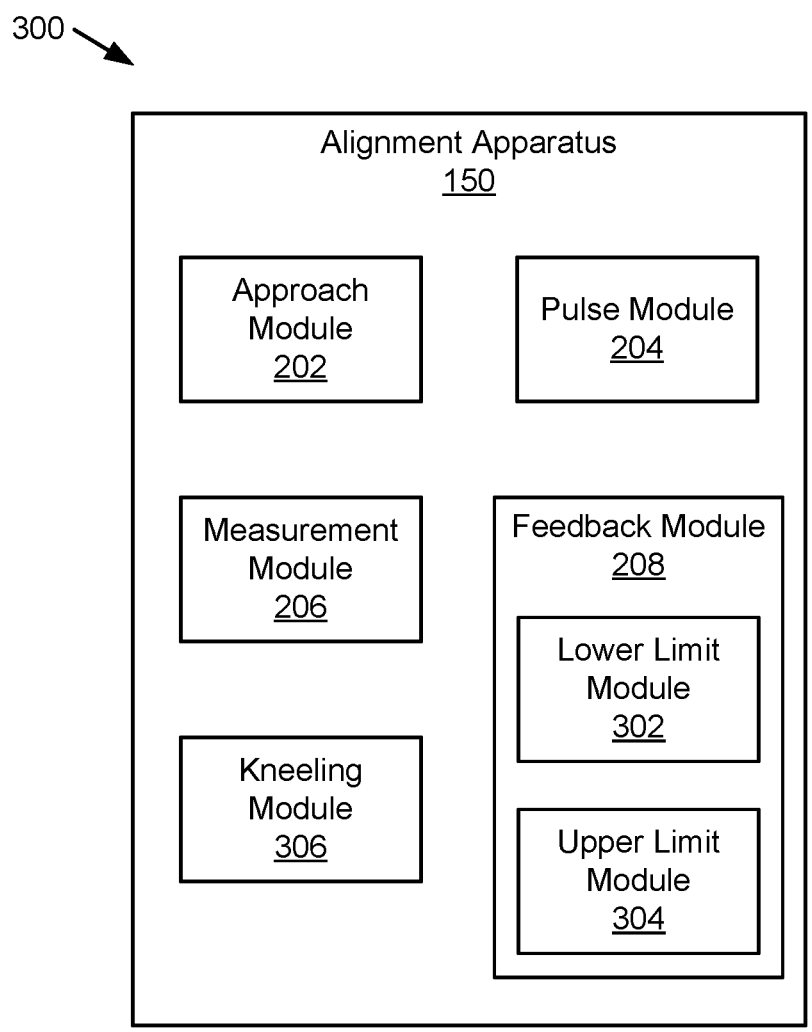
FIG. 3 is a schematic block diagram illustrating another embodiment of an apparatus for alignment in accordance with one embodiment of the present invention.

FIG. 3 is a schematic block diagram illustrating another embodiment of an apparatus 300 for alignment in accordance with one embodiment of the present invention. The apparatus 300 includes another embodiment of the alignment apparatus 150 that includes an approach module 202, a pulse module 204, a measurement module 206 and the feedback module 208, which are substantially similar to those describe above. The feedback module 208, in some embodiments, includes a lower link module 302 and an upper limit module 304, and/or the apparatus 300 includes a kneeling module 306, which are described below.

In one embodiment, the feedback module 208 includes a lower link module 302 that provides a visual indication that the amount of magnetic coupling is above a lower coupling limit and/or an audio signal that includes a distinct sound indicative of the amount of magnetic coupling being above the lower coupling limit. The lower coupling limit may be an amount of magnetic coupling where wireless power transfer efficiency is above an acceptable amount. For example, where 80 percent efficiency is set as a minimum acceptable efficiency, a particular magnetic coupling may correlate to 80 percent efficiency and the lower coupling limit may be set to a value where wireless power transfer efficiency is 80 percent. Efficiency, in one embodiment, may be defined as a ratio of output power to a load 110 to input power to the IPT system 102. In other embodiments, efficiency may be defined at other points in the WPT system 100.

For a visual display, the lower coupling limit may be displayed as a line across a bar chart display, a highlighted line for a moving needle display, etc. In another embodiment, the lower limit module 302 displays text, turns on a light, lights a portion of a display, etc. when the magnetic coupling reaches the lower coupling limit. Where the alignment signal is an audible signal, the lower limit module 302 may emit a particular sound, such as a constant tone, audible words, and the like to indicate that magnetic coupling has reached the lower coupling limit.

In another embodiment, the feedback module 208 includes an upper limit module 304 that provides a visual indication that the amount of magnetic coupling is below an upper coupling limit and/or an audio signal includes a distinct sound indicative of the amount of magnetic coupling being below the upper coupling limit. In certain circumstances, where magnetic coupling is high, damage to circuits may occur. The upper coupling limit may be set at a value of magnetic coupling for safe operation where higher values of magnetic coupling may cause damage. As with the lower coupling limit, the upper limit module 304 may have an upper line in a bar chart display, a line on a needle display, etc. or may light a portion of the display, a warning light, may display a warning, etc. Where the alignment signal is audible, the upper limit module 304 may have a separate distinctive tone for the upper coupling limit different than the lower coupling limit, may have audible words, etc.

In one embodiment, the feedback module 208 dynamically adjusts the lower coupling limit and the upper coupling limit in based on battery charge level of a battery 138 on the vehicle 140, a load level of the vehicle 140, one or more operating limits of a WPT system 100 that includes the primary pad 126 and/or the secondary pad 128, and the like. For example, as the battery 138 degrades, voltage, a charging profile, etc. may change and so the feedback module 208 may adjust the upper and lower coupling limits accordingly. In other embodiments, the feedback module 208 may adjust the upper and lower coupling limits based on an amount of air gap 108. One of skill in the art will recognize other ways that the feedback module 208 may adjust the upper and lower coupling limits based on operating conditions and parameters.

The apparatus 300, in one embodiment, includes a kneeling module 306 that lowers a portion of the vehicle 140 in response to the approach module 202 determining that the secondary pad 128 is within the approach distance limit of the primary pad 126. Some vehicles, such as a bus, may lower a portion of the bus close to doors to facilitate easier boarding by passengers. Kneeling typically affects magnetic coupling. The kneeling module 306 lowers at least a portion of the vehicle 140 so that as the vehicle 140 moves toward alignment, the height of the air gap 108 is closer to the height the vehicle 140 will be during wireless power transfer. In another embodiment, the feedback module 208 takes into account kneeling. For example, lower and upper coupling limits may be adjusted for kneeling so that if the vehicle 140 stops where magnetic coupling is between the upper and lower coupling limits, kneeling will not result in an increase in magnetic coupling beyond the upper coupling limit.

In another embodiment, the feedback module 208 provides the alignment signal to the driver of the vehicle 140 as the vehicle 140 approaches the primary pad 128 and/or the kneeling module 306 lowers the portion of the vehicle 140. For example, the driver may stop the vehicle once the feedback module 208 indicates that the magnetic coupling is above the lower coupling limit and the kneeling module 306 may then lower the vehicle 140 and the driver and/or the kneeling module 306 may stop kneeling of the vehicle 140 to prevent the magnetic coupling from exceeding the upper coupling limit. Other operational scenarios may also exist with a combination of vehicle movement and kneeling before, during, or after vehicle movement and in each scenario, the feedback module 208 may continue to provide feedback to the driver to prevent magnetic coupling outside of the upper and lower coupling limits.

Figure 4A:
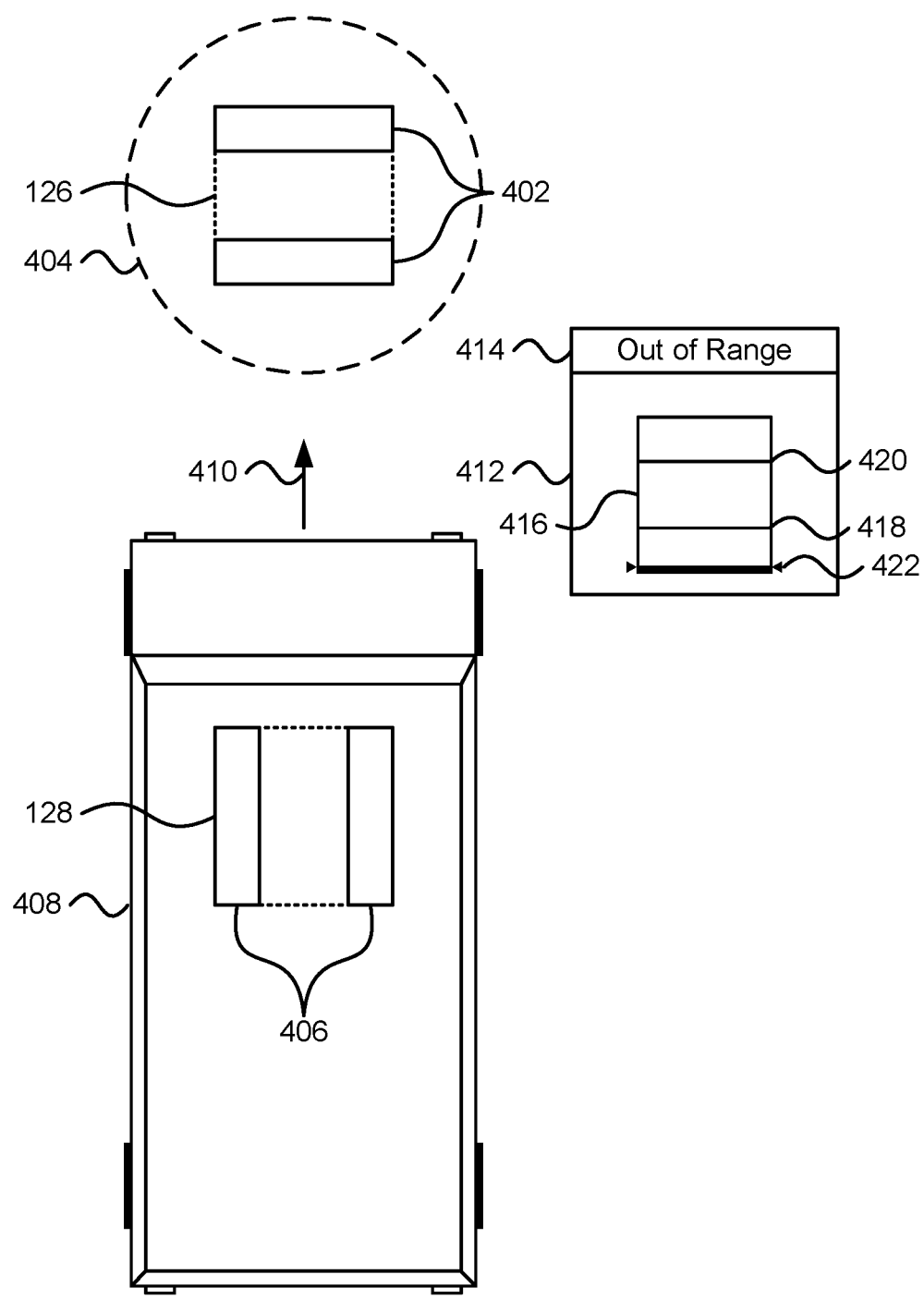
FIG. 4A is a schematic block diagram illustrating a vehicle with a secondary pad approaching a primary pad.

FIG. 4A is a schematic block diagram illustrating a vehicle 408 with a secondary pad 128 approaching a primary pad 126. The primary pad 126 includes two pads 402, such as the biplane pad described in U.S. Provisional Patent Application No. 62/321,647, filed Apr. 12, 2016, for Patrice Lethellier [hereinafter "the '647 application"], which is incorporated herein by reference. The secondary pad 128 includes two pads 406, which again are similar to the pads described in the '647 application. As described in the '647 application, the pads 402, 406 may be aligned for magnetic flux sharing to reduce flux leakage. An approach distance threshold 404 is depicted around the primary pad 126 as a dashed circle, but may also be a rectangle, a square, etc. The secondary pad 128 is depicted on a bus 408 and a direction of approach 410 is shown.

A display 412 is depicted with a range indicator 414 that indicates whether the secondary pad 128 is within the approach distance threshold 404 from the primary pad 126. In the depicted embodiment, not being within the approach distance threshold 404 is shown in the range indicator 414 as "Out of Range" where being within the approach distance threshold 404 is shown on the range indicator 414 as "In Range." The display 412 also includes an alignment signal displayed as a bar chart display 416 with a lower coupling limit 418, an upper coupling limit 420, and a level 422 of magnetic coupling. In the embodiment, the level 422 of magnetic coupling is at the bottom of the bar chart display 416 because the secondary pad 128 is not aligned with the primary pad 126.

Figure 4B:
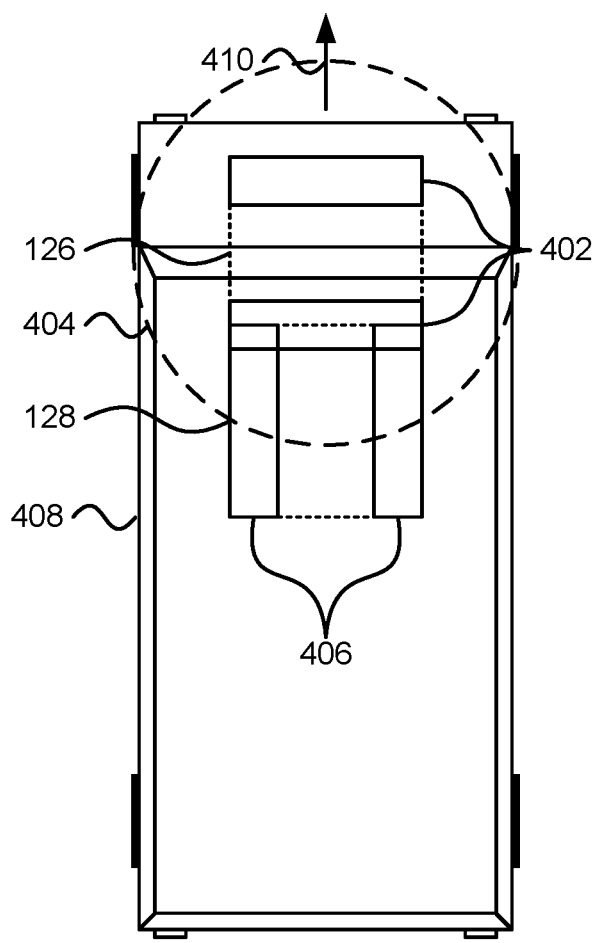
FIG. 4B is a schematic block diagram illustrating a vehicle with a secondary pad approaching a primary pad where the secondary pad is within an approach distance threshold of the primary pad.
Figure 4B:
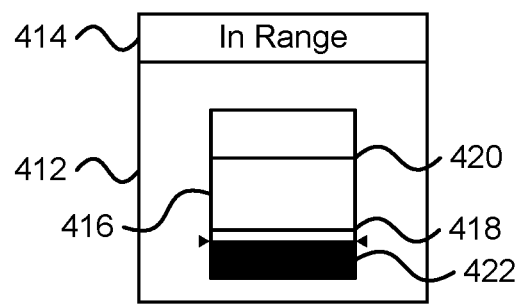

FIG. 4B is a schematic block diagram illustrating a vehicle 408 with a secondary pad 128 approaching a primary pad 126 where the secondary pad 128 is within an approach distance threshold 404 of the primary pad 126. In the depicted embodiment, a portion of the secondary pad 128 is within the approach distance threshold 404. In the example, a center of the secondary pad 128 is within the approach distance threshold 404 and the approach module 202 may determine that the secondary pad 128 is within the approach distance threshold 404 of the primary pad 126. In other embodiments, the approach distance threshold 404 may be larger and the approach module 202 may require that the entire secondary pad 128 is within the approach distance threshold 404.

In the embodiment, because the secondary pad 128 is within the approach distance threshold 404, the range indicator 414 displays "In Range." The pulse module 204 may then generate an alignment pulse and the measurement module 206 may measure magnetic coupling. The magnetic coupling is higher so the feedback module 208 displays the bar chart display 416 with the level 422 of magnetic coupling higher than in FIG. 4A, but lower than the lower coupling limit.

Figure 4C:
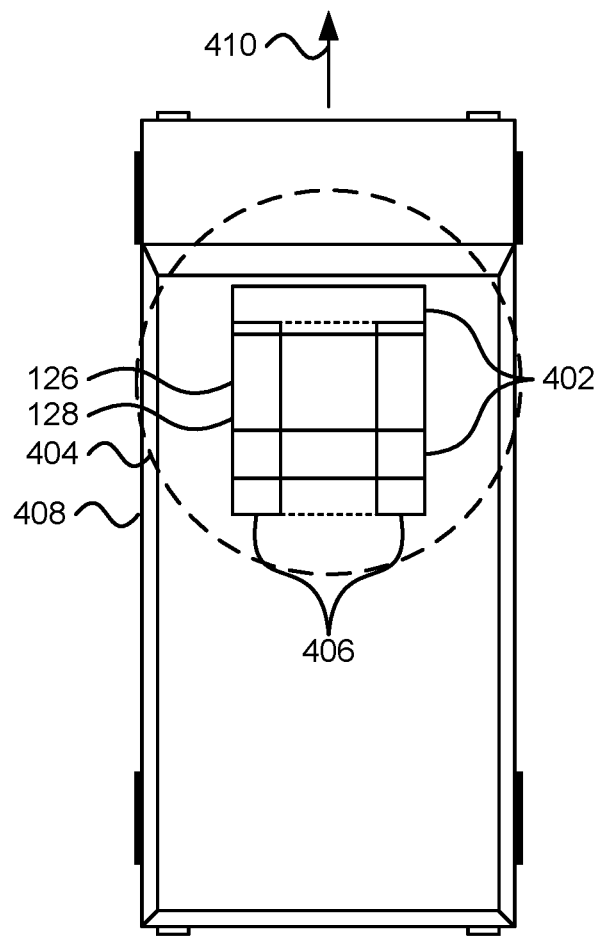
FIG. 4C is a schematic block diagram illustrating a vehicle with a secondary pad approaching a primary pad where the secondary pad is partially aligned with the primary pad.
Figure 4C:
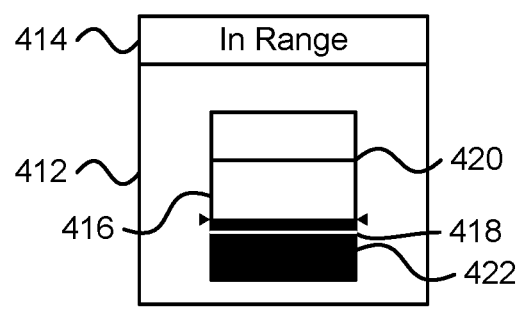
Figure 4D:
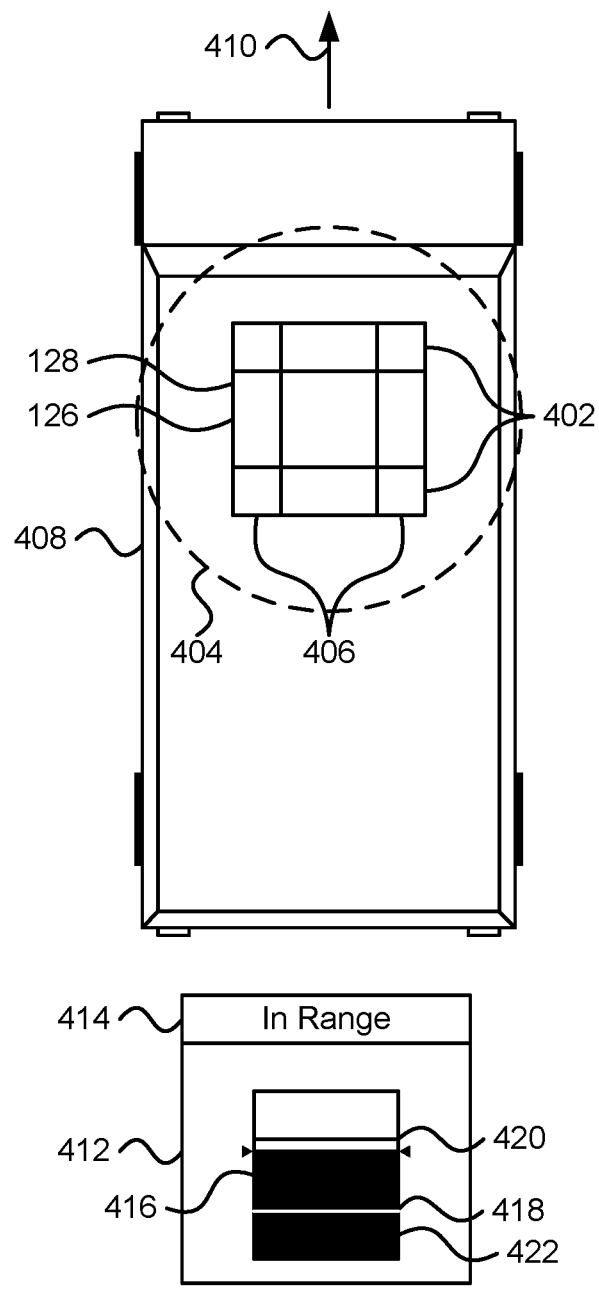
FIG. 4D is a schematic block diagram illustrating a vehicle with a secondary pad approaching a primary pad where the secondary pad is aligned with the primary pad.

FIG. 4C is a schematic block diagram illustrating a vehicle 408 with a secondary pad 128 approaching a primary pad 126 where the secondary pad 128 is partially aligned with the primary pad 126. In the embodiment, the level 422 of magnetic coupling is just above the lower coupling limit 418. FIG. 4D is a schematic block diagram illustrating a vehicle with a secondary pad 128 approaching a primary pad 126 where the secondary pad 128 is aligned with the primary pad 126. In the embodiment, the level 422 of magnetic coupling is below the upper coupling limit 420. In another example, such as during kneeling of the bus 408, the level 422 of magnetic coupling may be above the upper coupling limit 420 and may require slight movement of the bus 408 to bring the level 422 of magnetic coupling to between the lower coupling limit 418 and upper coupling limit 420.

Figure 5:
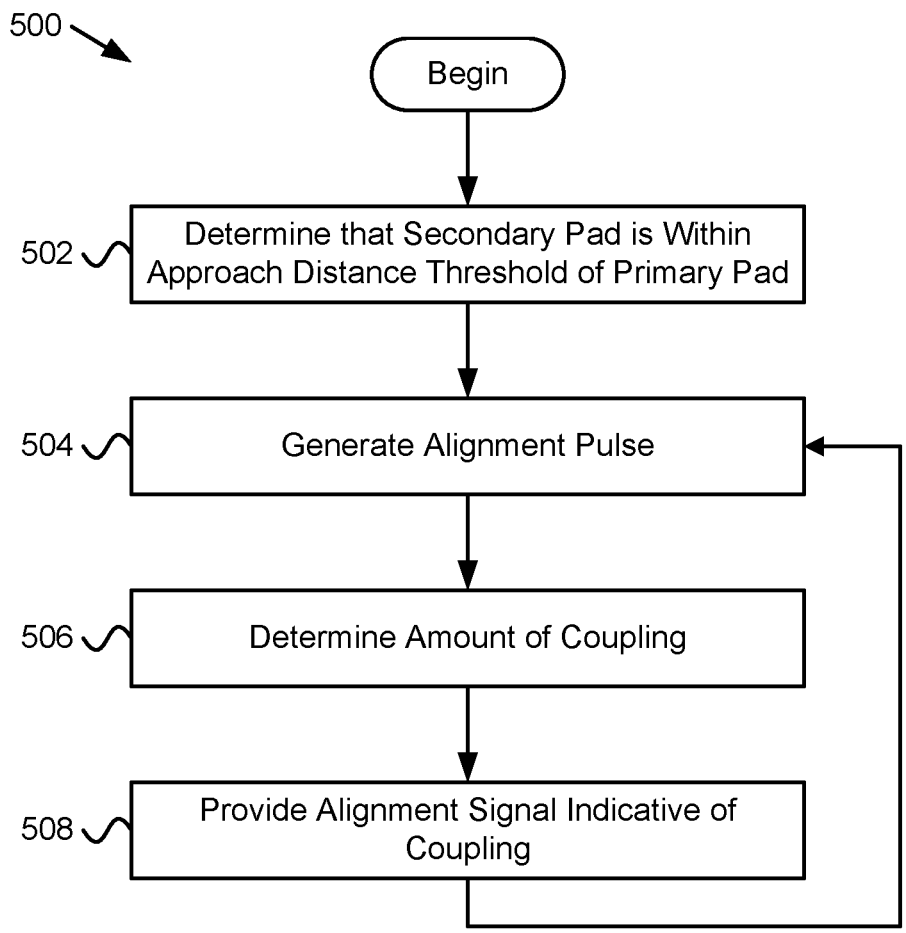
FIG. 5 is a schematic block diagram illustrating one embodiment of a method for alignment in accordance with one embodiment of the present invention.

FIG. 5 is a schematic block diagram illustrating one embodiment of a method 500 for alignment in accordance with one embodiment of the present invention. The method 500 begins and determines 502 that secondary pad 128 on a vehicle 140 approaching a primary pad 126 is within an approach distance threshold 404 from the primary pad 126. In one embodiment, the approach module 202 determines 502 if the secondary pad 128 is within the approach distance threshold 404 of the primary pad 126.

The method 500 generates 504 an electrical alignment pulse in the primary pad 126 or the secondary pad 128 in response to determining that the secondary pad is within the approach distance. In one embodiment, the pulse module 204 generates 504 the alignment pulse. The method 500 determines 506 an amount of magnetic coupling between the primary pad 126 and the secondary pad 128. In one example, the measurement module 206 determines 506 the amount of magnetic coupling. The method 500 provides 508 an alignment signal to a driver of the vehicle 140. The alignment signal is indicative of the amount of magnetic coupling. The feedback module 208, in one embodiment, provides 508 that alignment signal. The method 500 returns and continues to generate 504 an alignment pulse, continues to determine 506 the amount of magnetic coupling, and continues to provide 508 an updated alignment signal as the vehicle 140 moves.

Figure 6:
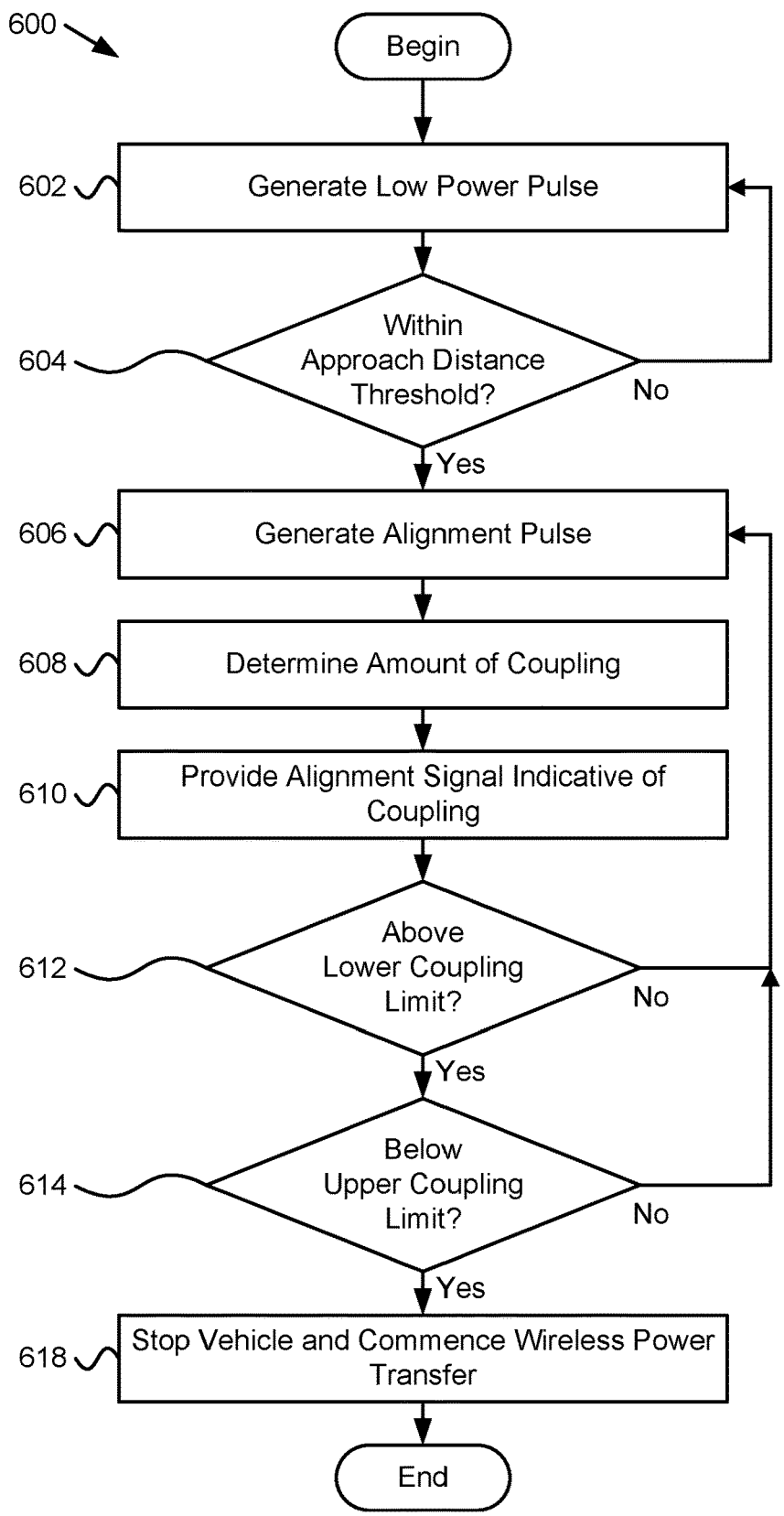
FIG. 6 is a schematic block diagram illustrating another embodiment of a method for alignment in accordance with one embodiment of the present invention.

FIG. 6 is a schematic block diagram illustrating another embodiment of a method 600 for alignment in accordance with one embodiment of the present invention. The method 600 begins and generates 602 a low power pulse and determines 604 if the secondary pad 128 is within the approach distance threshold 404 of the primary pad 126. The approach module 202, in one embodiment, generates 602 the low power pulse and determines 604 if the secondary pad 128 is within the approach distance threshold 404 of the primary pad 126. If the method 600 determines 604 that the secondary pad 128 is not within the approach distance threshold 404 of the primary pad 126, the method 600 returns and generates 602 a low power pulse. If the method 600 determines 604 that the secondary pad 128 is within the approach distance threshold 404 of the primary pad 126, the method 600 generates 606 an alignment pulse on the primary pad 126, or alternatively on the secondary pad 128. The method 600 determines 608 an amount of magnetic coupling between the primary pad 126 and the secondary pad 128 and provides 610 an alignment signal indicative of the magnetic coupling, for example on a display 412 or audibly.

The method 600 determines 612 if the magnetic coupling is above a lower coupling limit 418. The lower limit module 302 may determine 612 if the magnetic coupling is above the lower coupling limit 418. If the method 600 determines 612 that the magnetic coupling is below a lower coupling limit 418, the method 600 returns and generates 606 an alignment pulse. If the method 600 determines 612 that the magnetic coupling is above a lower coupling limit 418, the method 600 determines 614 if the magnetic coupling is below the upper coupling limit 420. The upper limit module 304 may determine 614 if the magnetic coupling is below the upper coupling limit 420. If the method 600 determines 614 that the magnetic coupling is above the upper coupling limit 420, the method 600 returns and generates 606 an alignment pulse. The method 600 may continue to provide 610 an alignment signal relative to the lower coupling limit 418 and the upper coupling limit 420. If the method 600 determines 614 that the magnetic coupling is below the upper coupling limit 420, the method 600 stops 618 the vehicle 140 and commences wireless power transfer, and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an approach module that determines that a wireless power transfer ("WPT") secondary pad on a vehicle approaching a WPT primary pad is within an approach distance threshold from the WPT primary pad;
   a pulse module that generates an electrical alignment pulse in one of the WPT primary pad and the WPT secondary pad in response to the approach module determining that the WPT secondary pad is within the approach distance threshold;
   a measurement module that determines an amount of magnetic coupling between the WPT primary pad and the WPT secondary pad; and a feedback module that provides an alignment signal to a driver of the vehicle, the alignment signal indicative of the amount of magnetic coupling, wherein the pulse module continues to provide electrical alignment pulses, the measurement module continues to determine an amount of magnetic coupling in response to the electrical alignment pulses, and the feedback module continues to provide the alignment signal to the driver indicative of an amount of the magnetic coupling as the vehicle moves in relation to the WPT primary pad.

2. The apparatus of claim 1, wherein the alignment signal is one or more of a visual indicator on an electronic display and an audio signal.

3. The apparatus of claim 1, wherein the feedback module further comprises a lower limit module that provides one or more of a visual indication that indicated the amount of magnetic coupling is above a lower coupling limit and an audio signal comprising a distinct sound indicative of the amount of magnetic coupling being above the lower coupling limit.

4. The apparatus of claim 3, wherein the feedback module further comprises an upper limit module that provides one or more of a visual indication that indicates the amount of magnetic coupling is below an upper coupling limit and an audio signal comprising a distinct sound indicative of the amount of magnetic coupling being below the upper coupling limit.

5. The apparatus of claim 4, wherein the feedback module dynamically adjusts the lower coupling limit and the upper coupling limit is based on one or more of a battery charge level of a battery on the vehicle, a load level of the vehicle, and one or more operating limits of a wireless power transfer system comprising the WPT primary pad and WPT the secondary pad.

6. The apparatus of claim 1, wherein:
the pulse module generates the electrical alignment pulse in the WPT primary pad; and
the measurement module measures a secondary voltage on a circuit coupled to the WPT secondary pad and a primary current in the WPT primary pad, wherein the amount of magnetic coupling is proportional to a ratio of the secondary voltage and the primary current.

7. The apparatus of claim 1, wherein:
the pulse module generates the electrical alignment pulse in the WPT secondary pad; and
the measurement module measures a primary voltage on a circuit coupled to the WPT primary pad and a secondary current in the WPT secondary pad, wherein the amount of magnetic coupling is proportional to a ratio of the primary voltage and the secondary current.

8. The apparatus of claim 1, wherein the approach module determines if the WPT secondary pad is within the approach distance threshold from the WPT primary pad by one of:
generating a low power pulse on the WPT secondary pad and determining if a signal is present on the WPT primary pad is above an approach signal threshold; and
generating a low power pulse on the WPT primary pad and determining if a signal is present on the WPT secondary pad is above an approach signal threshold, wherein the low power pulse has a power level lower than a power level for wireless power charging from the WPT primary pad to the WPT secondary pad.

9. The apparatus of claim 8, wherein the approach module generates the low power pulse in response to one or more of:

a radio contact between the vehicle and one or more components of a first stage comprising the WPT primary pad;
a radio signal strength between the vehicle and one or more components of the first stage comprising the WPT primary pad being above a radio signal threshold;
a speed of the vehicle being below a speed threshold; and
a global positioning satellite ("GPS") signal indicating that the WPT secondary pad is within a GPS distance limit from the WPT primary pad.

10. The apparatus of claim 8, wherein the approach module performs one or more of:
automatically generates the low power pulse;
manually generates the low power pulse in response to an input from an operator of the vehicle; and
manually generates the low power pulse in response to an input from an operator of the vehicle and one or more safety conditions being met.

11. The apparatus of claim 8, wherein the approach module generates the low power pulse from the WPT secondary pad and the pulse module generates the electrical alignment pulse on the WPT primary pad.

12. The apparatus of claim 1, wherein the pulse module generates the electrical alignment pulse prior to the WPT primary pad transmitting power to the WPT secondary pad during a wireless power transfer operation to provide a power to a load of the vehicle.

13. The apparatus of claim 1, wherein the approach distance threshold is set based on magnetic field safety limits.

14. The apparatus of claim 1, further comprising a kneeling module that lowers a portion of the vehicle, wherein the feedback module provides the alignment signal to the driver of the vehicle in response to one or more of
the vehicle approaching the WPT primary pad; and
the kneeling module lowering the portion of the vehicle.

15. The apparatus of claim 1, wherein the electrical alignment pulse comprises one of:
a constant amount of energy for a period of time followed by a time with no pulse, wherein the pulse module provides a plurality of alignment pulses as the vehicle moves in relation to the WPT primary pad; and
a ramped alignment pulse, the ramped alignment pulse generated by increasing an amount of energy over a period of time, wherein the pulse module provides a plurality of ramped alignment pulses as the vehicle moves in relation to the WPT primary pad.

16. A system comprising:
a first stage of a wireless power transfer ("WPT") system, the first stage comprising a WPT primary pad and one or more of a resonant converter and an alternating current ("AC") to direct current ("DC") converter, the first stage configured to wirelessly transmit power to a second stage on a vehicle, the second stage comprising a WPT secondary pad and a secondary circuit that receives power from the WPT primary pad and transfers power to a load of the vehicle;
an approach module that determines that a WPT secondary pad on a vehicle approaching the WPT primary pad is within an approach distance threshold from the WPT primary pad;
a pulse module that generates an electrical alignment pulse in one of the WPT primary pad and the WPT secondary pad in response to the approach module determining that the WPT secondary pad is within the approach distance;

a measurement module that determines an amount of magnetic coupling between the WPT primary pad and the WPT secondary pad; and a feedback module that provides an alignment signal to a driver of the vehicle, the alignment signal indicative of the amount of magnetic coupling, wherein the pulse module continues to provide electrical alignment pulses, the measurement module continues to determine an amount of magnetic coupling in response to the electrical alignment pulses, and the feedback module continues to provide alignment signals to the driver indicative of an amount of magnetic coupling as the vehicle moves in relation to the WPT primary pad.

17. The system of claim 16, further comprising one or more of the second stage, the vehicle and the load.

18. A method comprising:

determining that a wireless power transfer ("WPT") secondary pad on a vehicle approaching a WPT primary pad is within an approach distance threshold from the WPT primary pad;

generating an electrical alignment pulse in one of the WPT primary pad and the WPT secondary pad in response to determining that the WPT secondary pad is within the approach distance threshold;

determining an amount of magnetic coupling between the WPT primary pad and the WPT secondary pad; and providing an alignment signal to a driver of the vehicle, the alignment signal indicative of the amount of magnetic coupling, wherein the method continues to provide electrical alignment pulses, continues to determine an amount of magnetic coupling in response to each of the electrical alignment pulses, and continues to provide alignment signals to the driver indicative of an amount of magnetic coupling as the vehicle moves in relation to the WPT primary pad.

19. The method of claim 18, further comprising providing one or more of a visual indication that indicates the amount of magnetic coupling is above a lower coupling limit and an audio signal comprising a distinct sound indicative of the amount of magnetic coupling being above the lower coupling limit, and further comprising providing one or more of a visual indication that indicates the amount of magnetic coupling is below an upper coupling limit and an audio signal comprising a distinct sound indicative of the amount of magnetic coupling being below the upper coupling limit.

20. The method of claim 18, wherein the determining if the WPT secondary pad is within the approach distance threshold from the WPT primary pad comprises one of:

generating a low power pulse on the WPT secondary pad and determining if a signal is present on the WPT primary pad is above an approach signal threshold; and generating a low power pulse on the WPT primary pad and determining if a signal is present on the WPT secondary pad is above an approach signal threshold, wherein the low power pulse has a power level lower than a power level for wireless power charging from the WPT primary pad to the WPT secondary pad.

* * * * *